United States Patent Office 3,021,264
Patented Feb. 13, 1962

3,021,264
PURIFICATION OF PENTABORANE
Norman Kirk, Schenectady, N.Y., assignor to General Electric Company, a corporation of New York
No Drawing. Filed July 28, 1958, Ser. No. 751,110
4 Claims. (Cl. 202—52)

This invention relates to a new and improved process for purifying pentaborane. More particularly, the invention relates to a process for obtaining pure pentaborane ($B_5H_9$) from mixtures of the latter with other boron hydrides, such as diborane ($B_2H_6$), tetraborane ($B_4H_{10}$), dihydropentaborane ($B_5H_{11}$), etc., which process comprises removing the tetraborane at a temperature below 50° C. under reduced pressure.

Boron hydrides have found eminent use as rocket fuels and as fuels for other types of propelled devices. Among the boron hydrides which have been found to have greatest utility is pentaborane. However, unfortunately, in order to obtain pure pentaborane and thus to realize its maximum efficiency, it has been necessary to resort to complicated means for purifying the pentaborane. The means whereby the impure boranes are removed from the pentaborane requires expensive equipment and labor due to the fact that the tetraborane has great affinity for the pentaborane.

There are many reasons why it is essential that the pentaborane be purified to remove therefrom the other boron hydrides mentioned above. In the first place, the presence of such boron hydrides as tetraborane and dihydropentaborane causes instability of pentaborane. The presence of the first two boron hydrides can result in the formation of hot spots which can trigger a spontaneous combustion of the pentaborane. Moreover, it has also been found that upon standing, the tetraborane and the dihydropentaborane will tend to decompose to release hydrogen and this will cause a buildup in pressure in vessels which contain the pentaborane with the above-mentioned two impurities. This obviously poses a dangerous situation and therefore is one of the main reasons why it is essential that the tetraborane and the dihydropentaborane be removed.

I have also found that the presence of tetraborane in combination with pentaborane results in a reaction between the two boranes resulting in decomposition to solid products, thereby reducing the quantities of pentaborane (which is the more desirable and more stable boron hydride) available for fuels. The tetraborane apparently is quite highly reactive with the pentaborane at temperatures of around 65° C. or so.

Unexpectedly, I have discovered a rapid, simple and efficient means for purifying pentaborane containing tetraborane therein by subjecting the impure pentaborane to a fractional distillation at a temperature below 50° C. under reduced pressure. By my process, the tetraborane is removed rapidly from contact with the pentaborane before it has a chance to react with the latter to form boron hydride solids of higher molecular weight than pentaborane and diborane, which would lead to reduced yields of the desired pentaborane. After removal of the tetraborane, the pentaborane is heated, for instance, within the temperature range of about 35 to 65° C. for several hours. During this period, all the dihydropentaborane (which is difficult to separate from the pentaborane because of the close boiling points of these latter two boranes) and other remaining liquid impurities react to form either pentaborane, diborane, or solids. Any hydrogen which may be present and diborane are purged from the system and pure pentaborane is rapidly distilled into a suitable receiver. The solids remain behind in the reaction. The solids are non-volatile and therefore offer no problem.

If the removal of the tetraborane is carried out at elevated temperatures above 50° C., undesirable reaction occurs between the pentaborane and the tetraborane resulting in greatly reduced yields of the pentaborane.

The temperature at which the tetraborane is removed from the impure pentaborane is preferably in the range of from about 10° to 50° C., advantageously within the range of about 15° to 40° C. The reduced pressure is below 760 mm. of Hg when measured at 27° C., and preferably from about 100 to 400 mm. of Hg.

The tetraborane and any other volatile products which may come over are suitably collected by means of condensers which are cooled to around −20° C.

After the tetraborane has been removed, the remaining mixture can be heated at temperatures of from 35° to 65° C. for a time ranging from about 2 to 8 hours to effect thermal decomposition of the other impurities and thereby to allow one to obtain essentially pure pentaborane.

In order that those skilled in the art may better understand how the present invention may be practiced, the following example is given by way of illustration and not by way of limitation. All parts are by weight.

Example 1

About 300 parts of crude pentaborane composed, by weight, of 0.4 percent diborane, 0.6 percent tetraborane (boiling point 18° C.), 7.2 percent dihydropentaborane (boiling point 63° C.), and 91.5 percent pentaborane (boiling point 58° C.) was charged to the reboiler of a fractionating column, in which the column was attached to a reflux condenser cooled to −20° C. The pressure in the column and the reboiler was reduced to 300 mm. of Hg mercury absolute, and the temperature of the ingredients maintained at around 35° C. The tetraborane quickly distilled to the top of the distillation column and was removed as distillate before it had a chance to react with the other products. The remaining composition was heated at the reflux temperature of the mass (about 35° C.) for 8.5 hours and thereafter the pentaborane was withdrawn as a distillate product while still maintaining the reduced pressure. The pentaborane thus obtained was tested and found to be at least 99% pure. The total yield of pure pentaborane from the original crude pentaborane was about 95% yield. The proof of the efficiency of the purification technique described in this example was established by the fact that no dihydropentaborane was found in any of the distillate products or in the residue. About 1.3%, by weight, solids based on this original charge of the material, was found as a solid residue.

The following example illustrates the reduced yields of pentaborane obtained when a usual distillation technique is employed to free the pentaborane from impurities contained therein.

Example 2

About 930 parts of crude boron hydrides composed, by weight, of 1.6% diborane, 5.0% tetraborane, 3.4% dihydropentaborane, and 90% pentaborane were refluxed for 3½ hours at a temperature of about 67° C. This reflux step was essential in order that rearrangement could take place of the boron hydrides boiling close to pentaborane so that the subsequent distillation would yield pentaborane of the desired purity. The volatile diborane and any hydrogen formed during the reflux period were continuously vented during the above heating period. At the end of the reflux, essentially pure pentaborane was obtained from the refluxed mass by a simple distillation. The amount of pentaborane obtained was in about a 70% yield based on the amount of pentaborane in the crude mixture of boron hydrides originally employed. The pot residue contained a weight amount of solids equal to 21.5% of the original total charge.

The above Example 2 in addition to showing the undesirable reduction in yield of pentaborane obtained by attempting to employ usual techniques for isolating pentaborane, also shows that a good part of the loss of the pentaborane in such a procedure was due to the reaction of the pentaborane with the tetraborane in the charge as evidenced by the large increase in solids residue over that obtained in the practice of the invention as illustrated in Example 1.

It will of course be apparent to those skilled in the art that the conditions in the foregoing examples may be varied within the ranges described previously without departing from the scope of the invention.

What I claim as new and desire to secure by Letters Patent of the United States is:

1. The process of obtaining pure pentaborane from a mixture of the latter with at least one boron hydride including tetraborane which comprises rapidly removing the tetraborane from the mixture before the tetraborane has a chance to react with the pentaborane by subjecting the impure pentaborane to a pressure below 760 mm. of Hg at a temperature below 50° C. until all the tetraborane is removed, and thereafter isolating the purified pentaborane.

2. The process as in claim 1 in which the impure mixture of pentaborane includes, in addition to tetraborane, diborane and dihydropentaborane.

3. The process as in claim 1 in which the pressure is reduced to between 100 to 400 mm. of Hg and the temperature is maintained below 40° C.

4. The process of preparing pure pentaborane from a mixture of the latter with impurities of tetraborane and diborane, which process comprises subjecting the impure pentaborane to a pressure of from 100–400 mm. of Hg at a temperature of from 10 to 50° C. so as to rapidly remove essentially all the tetraborane therein present before the tetraborane has a chance to react with the pentaborane, heating the resulting mixture at a temperature of from 35 to 65° C. to effect thermal decomposition of the other impurities present therein, and thereafter distilling the pentaborane in an essentially pure state.

References Cited in the file of this patent

FOREIGN PATENTS 623,760     Great Britain _____ of 1949
514,804     Canada _____ July 19, 1955

OTHER REFERENCES

Stock: "Hydrides of Boron and Silicon" (1957), pp. 43–48.

Berichte der Deutschen Chemischen Gesellschaft, Jahrg 57 (pub. Berlin, 1924), Stock, pages 562–575.

Introduction to the Chemistry of Hydrides (Hurd) New York, 1952, pages 77–80.